3,389,983
METHOD AND APPARATUS FOR REMOVING
DROSS FROM THE SURFACE OF A MOLTEN
METAL GLASS SHEET FLOAT BATH
Albert Sidney Robinson, Birkdale, Southport, and Frederick William Silverwood, Appley Bridge, England, assignors to Pilkington Brothers Limited, Liverpool, England, a corporation of Great Britain
Filed July 21, 1964, Ser. No. 384,096
Claims priority, application Great Britain, July 23, 1963, 29,166/63
9 Claims. (Cl. 65—27)

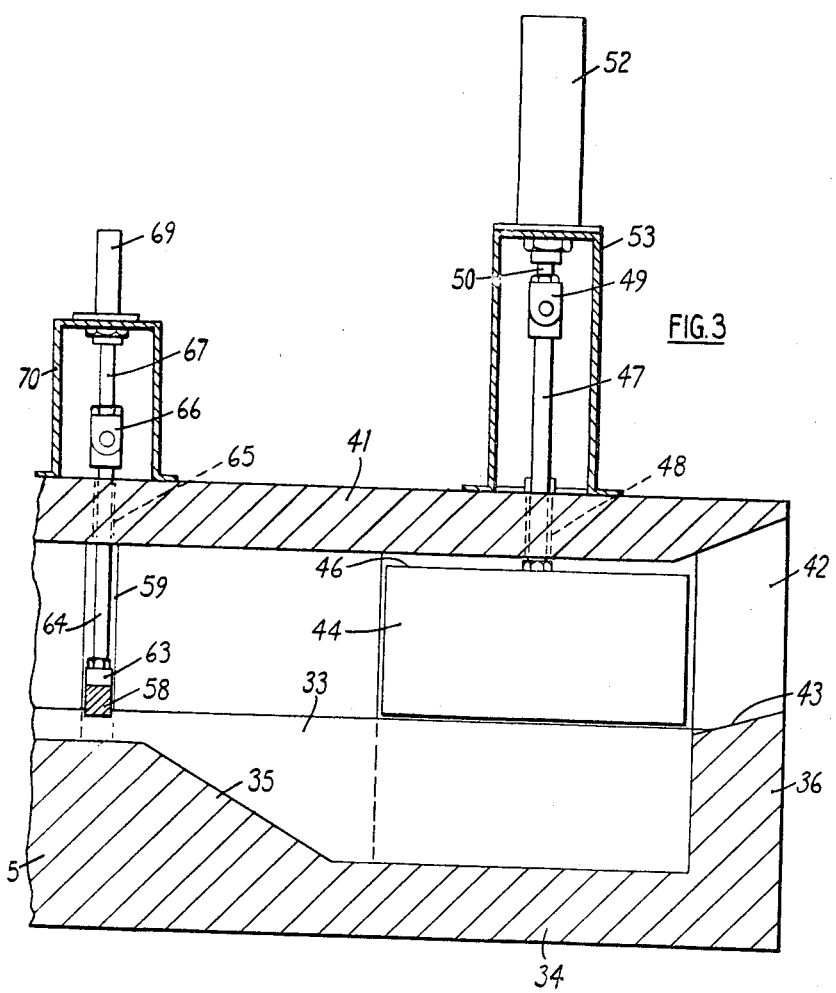

ABSTRACT OF THE DISCLOSURE

A method and apparatus for removing dross from the surface of molten metal along which a ribbon of glass is being advanced in which surface flow of molten metal is engendered into a defined zone of the molten metal, and dross is trapped in that zone during cyclic flow of molten metal into and out of the zone.

Figure 1:
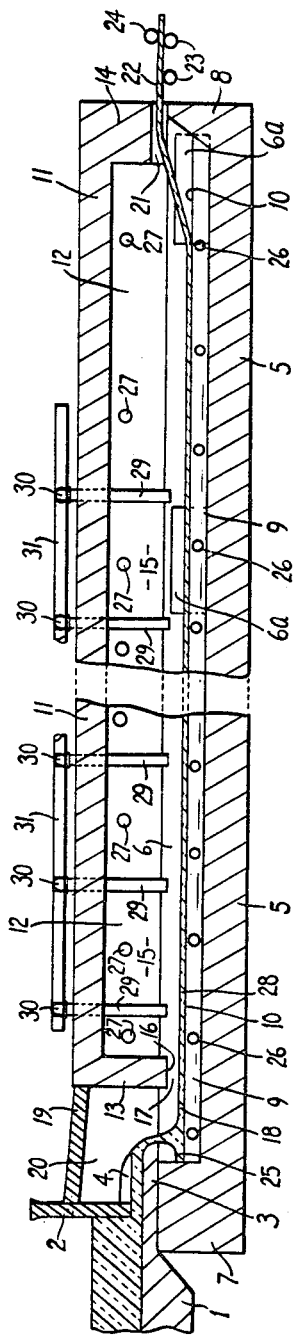

This invention relates to the manufacture of flat glass, and in particular to the manufacture of flat glass in ribbon form during which a ribbon of glass is advanced along a bath of molten metal.

The molten metal of the bath is, for example, molten tin or a tin alloy having a specific gravity greater than glass, for example the bath is so constituted as to have all the characteristics fully described in U.S. Patents Nos. 2,911,759 and 3,083,551.

In order to protect the molten metal of the bath a protective atmosphere is preferably maintained over the bath, but the presence of traces of impurities in the atmosphere and in the molten metal bath may result in the presence of dross which collects at the surface of the bath, this dross being composed of products of reactions between impurities and the bath metal. Impurities in the molten metal bath, for example, oxygen and/or sulphur, may be scavenged from the bath by maintaining in the bath a trace of an element with which impurities in the bath preferentially react. Products of such reactions of a trace element with impurities may also appear as a fine dross which accumulates at the surface of the molten metal.

It is a main object of the present invention to provide an improved method of manufacturing flat glass in ribbon form during which a ribbon of glass is advanced along a bath of molten metal, and in which dross is removed from the molten metal.

Accordingly the invention provides, in the manufacture of flat glass during which glass is in contact with a body of molten metal, defining a zone of the molten metal communicating with said body of molten metal, flowing molten metal from the surface of the body of molten metal into the zone so that dross is carried into the zone, then removing dross from that molten metal and returning the molten metal back into said body of molten metal.

The dross formed in the molten metal is in a fine state and gradually rises to the surface of the molten metal where it accumulates, and in a preferred embodiment of the invention a surface flow of molten metal into the zone is caused so that dross on the surface of the molten metal is carried into the zone, and then molten metal is displaced from the zone while any dross on the surface of the molten metal in the zone is trapped in the zone.

Further according to the invention, in the manufacture of flat glass in ribbon form during which glass is advanced along a bath of molten metal including a defined zone of bath metal, a surface flow of molten metal is caused into the zone so that dross on the surface of the molten metal is carried into the zone, and then molten metal is displaced from the zone while any dross on the surface of the molten metal in the zone is trapped in the zone.

The removal of dross from the molten metal in this way may be effected from time to time as dross tends to accumulate. However preferably according to the invention dross is continually removed into the zone by cyclically effecting said surface flow of molten metal into the zone and subsequent displacement of molten metal from the zone.

Further the invention includes defining a channel in the bath of molten metal, which channel communicates with the zone and through which channel said flows of molten metal into and from the zone are produced.

A preferred method according to the invention includes cyclically reducing the effective depth of the channel in the bath to accentuate surface flow of molten metal into the zone, and then shutting-off surface flow of the metal in the channel to hold back dross on the surface of the molten metal being displaced from the zone through the channel.

As a further feature, dross may be collected in a region of said zone and the collected dross extracted through an outlet for the dross. Alternatively the dross in the zone may be removed directly from the surface of the molten metal in the zone through an outlet from the zone.

The invention also comprehends apparatus for use in the manufacture of flat glass, comprising an elongated tank structure containing a bath of molten metal and including structural means defining a zone of the molten metal of the bath, means for advancing glass along the bath towards an outlet from the bath, means for causing a surface flow of molten metal into said zone so that dross at the surface of the molten metal is carried into the zone, means in the zone for removing dross from that molten metal, and means for causing a return flow of molten metal from the zone.

A preferred embodiment of apparatus according to the invention comprises an elongated tank structure containing a bath of molten metal and including structural means defining a zone of molten metal of the bath, means for advancing glass along the bath towards an outlet from the bath, means operable to displace molten metal from said zone and then to permit flow of molten metal back into the zone so that dross on the surface of the molten metal is carried into the zone, and a gate movable through the surface of the molten metal and operable to hold back in the zone dross on the surface of the zone of molten metal, as molten metal is displaced from the zone.

Further the invention provides apparatus for use in the manufacture of flat glass in ribbon form, comprising an elongated tank structure containing a bath of molten metal and including structural means defining a zone of molten metal of the bath, means for advancing glass in ribbon form along the bath towards an outlet from the bath, means operable to displace molten metal from said zone and then to permit flow of molten metal back into the zone so that dross on the surface of the molten metal is carried into the zone, and a gate movable through the surface of the molten metal and operable to hold back in the zone dross on the surface of the zone of molten metal, as molten metal is displaced from the zone.

Preferably a recess is formed in the tank structure, which recess contains a pocket of molten metal forming said zone of molten metal.

In a preferred embodiment of the invention the recess communicates with the main tank structure through a channel, the outer end of the recess being formed to cooperate with at least one plunger which is movable into and out of the recess to displace molten metal from the pocket through the channel, and then to induce flow of molten metal into the pocket.

In an alternative construction the outer end of the recess is formed into an alcove at either side, and there are two plungers respectively movable into and out of said alcoves.

Preferably the gate consists of a bar, for example of carbon, silicon carbide or spheroidal graphite cast iron, seated in slots in the side walls of the channel, the height of the bar being less than the depth of the channel, and the apparatus includes means for raising and lowering the bar in synchronism with the movement of said plunger or plungers, so that when the bar is lowered to contact the floor of the channel surface flow of molten metal into the pocket is accentuated, and when the bar is raised into the surface of the molten metal in the channel molten metal from the pocket can be displaced under the bar, while the bar traps any dross on the surface of the molten metal in the pocket.

In a modified apparatus according to the invention a sill is fixed in the recess across the pocket to delimit a region of the pocket, means are provided for directing dross from the surface of the molten metal and over the sill so that dross is collected behind the sill, and the outer wall of the recess is formed with an outlet through which collected dross can be removed.

Figure 2:
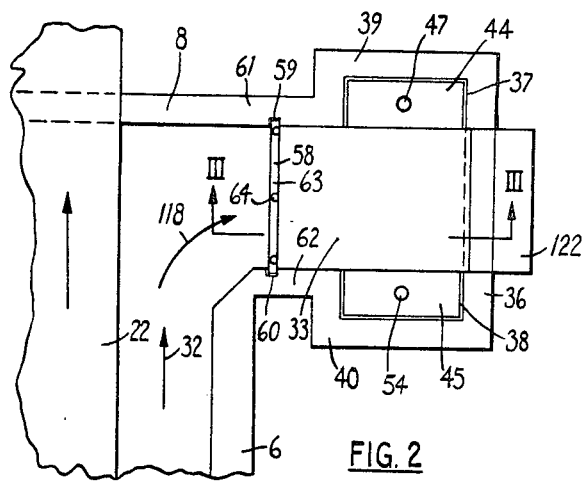
Figure 6:
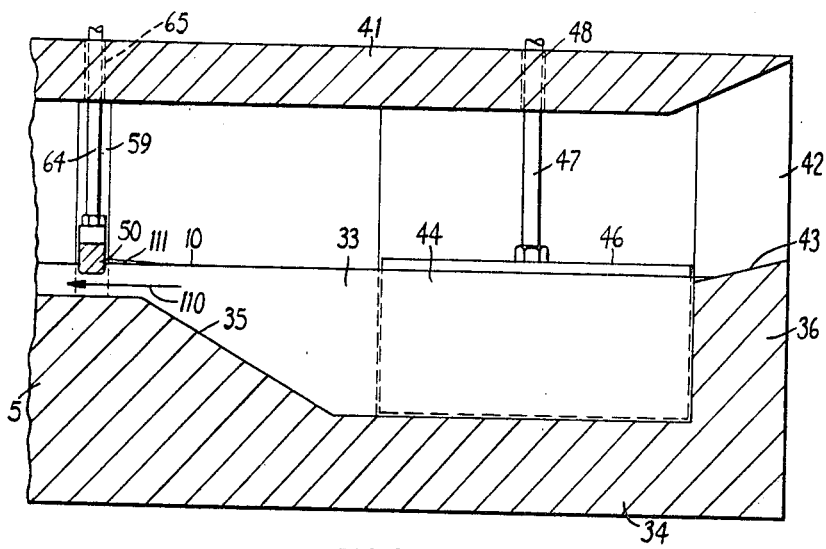
Figure 4:
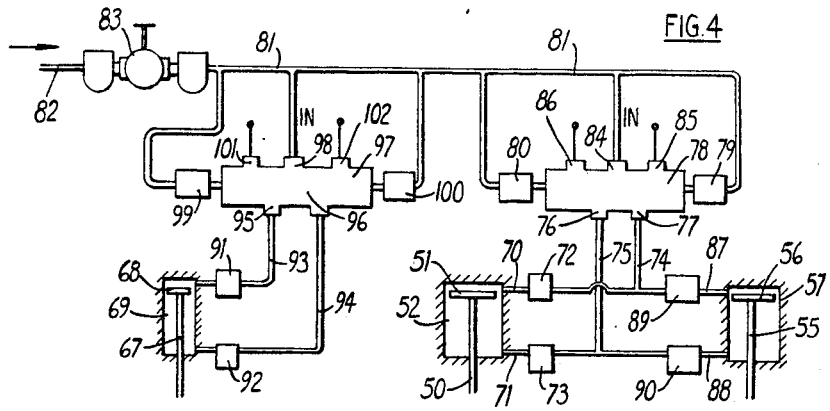
Figure 5:
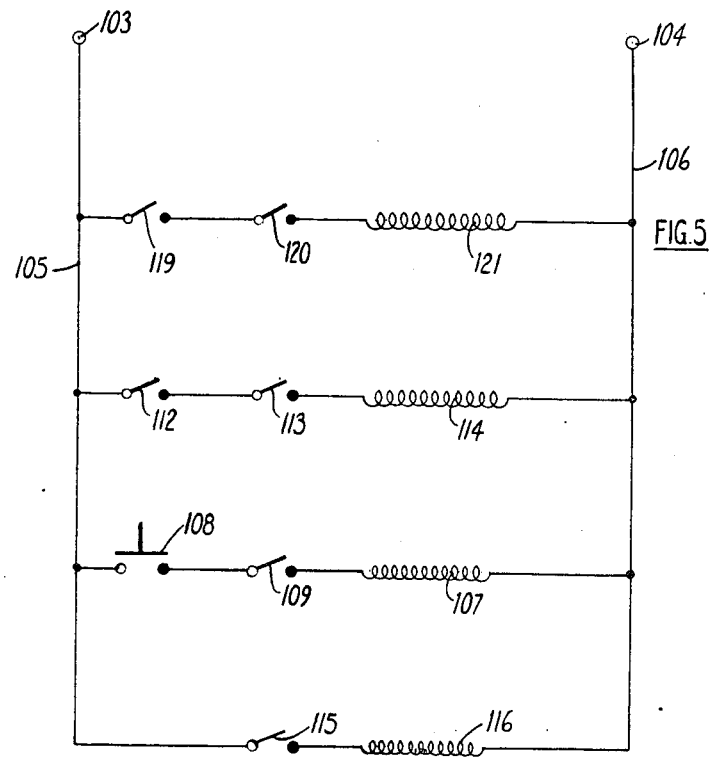
Figure 7:
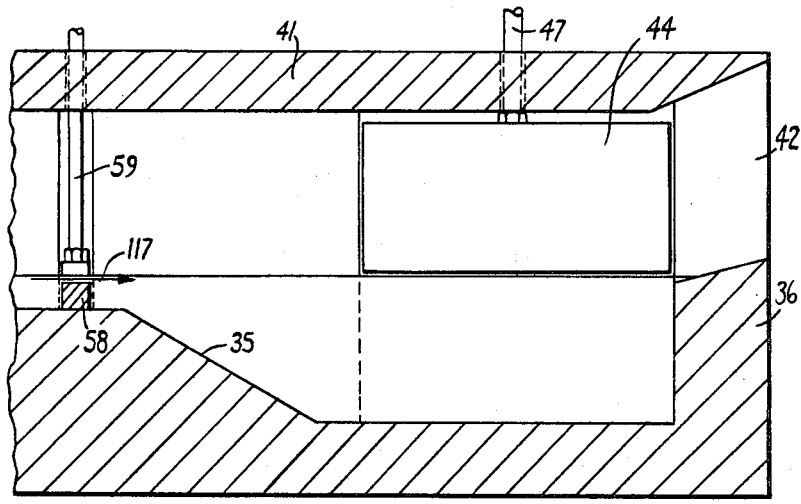
Figure 8:
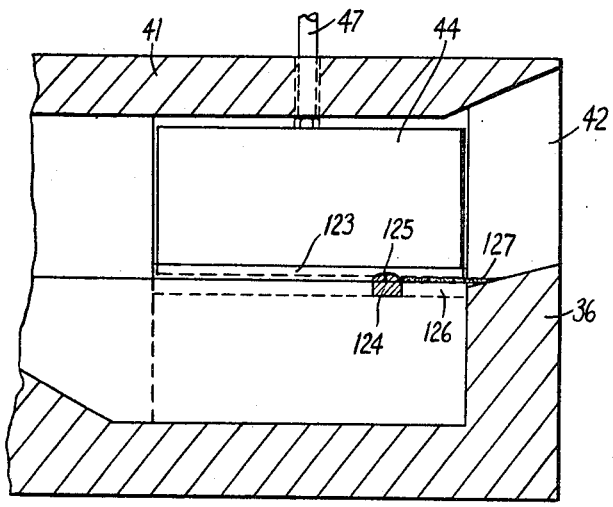

In order that the invention may be more clearly understood some embodiments thereof will now be described, by way of example, with reference to the accompanying diagrammatic drawings, in which:

FIGURE 1 is a central longitudinal sectional elevation of apparatus according to the invention comprising an elongated tank structure containing a bath of molten metal, and a superimposed roof structure in one side wall of the tank structure, FIGURE 2 is a plan view of a part of the tank structure showing one of the recesses in detail, FIGURE 3 is a section on line III—III of FIGURE 2 showing the first stage in the operation of the apparatus of FIGURE 2, FIGURE 4 is a pneumatic circuit for operating the apparatus of FIGURES 2 and 3, FIGURE 5 is an electrical circuit which controls the pneumatic circuit of FIGURE 4, FIGURE 6 is a view similar to FIGURE 3, but showing the second stage in the operation of the apparatus, FIGURE 7 is a view similar to FIGURES 3 and 6 showing the third stage in the operation of the apparatus, and FIGURE 8 is a view similar to FIGURE 6, showing a sill in position in the recess.

In the drawings the same reference number designate the same or similar parts.

Referring to FIGURE 1 of the drawings, a forehearth of a continuous glass melting tank is indicated at 1 a regulating tweel at 2. The forehearth ends in a spout comprising a lip 3 and side jambs 4, one of which is shown. The side jambs 4 and lip 3 form a spout of generally rectangular cross section. A cover may be secured over the spout in known manner.

The spout 3, 4 is disposed above the floor 5 of a tank structure including side walls 6 joined together by end walls 7 and 8 integral with the side walls 6 and the floor 5. This tank structure contains a bath 9 of molten metal, for example molten tin or an alloy of tin having a specific gravity greater than glass. The level of the surface of the bath is indicated at 10.

A roof structure is supported on the tank structure, and the roof structure includes a roof 11, side walls 12 and end walls 13 and 14 respectively at the inlet and outlet ends of the bath. The roof structure thus provides a tunnel over the bath and defines a headspace 15 over the bath.

The lower face 16 of the end wall 13 defines with the surface 10 of the bath an inlet 17, which is restricted in height, for glass 18 as it is advanced over the bath. The roof structure is extended to the tweel 2 by a roof element 19, and side walls 20 which form a chamber in which the spout is situated. The lower face of the end wall 14 of the roof structure defines with the end wall 8 of the tank structure an outlet 21 for the ultimate ribbon of glass 22 which is discharged from the bath.

Driven conveying rollers 23 are mounted outside the outlet end of the tank and are disposed somewhat above the level of the top of the tank end wall 8. Superimposed driven rollers 24 are provided, and the rollers 23 and 24 co-operate to apply tractive effort to the ribbon of glass 22 moving towards the outlet 21 from the bath, which tractive effort assists in advancing the ribbon of glass along the bath. The ribbon 22 is directed by the rollers to a conventional tunnel lehr in which the ribbon is annealed, as is well understood in the art, and on leaving the lehr the ribbon is cut into sheets of desired size.

Molten glass is poured on to the bath 9 of molten metal from the spout 3, 4. The tweel 2 regulates the flow of molten glass from the spout lip 4 and the spout is vertically spaced from the surface of the bath so that the molten glass has a free fall of a few inches to the bath, which distance is such as to ensure a heel 25 of molten glass being formed behind the glass falling from the spout, which heel extends rearwardly to the end wall 7 of the tank structure.

The temperature of the bath is regulated from the inlet end to the discharge end by providing thermal regulators 26 immersed in the molten metal bath 9. Radiant heaters 27 are provided in the headspace 15 to assist the temperature regulation. The temperature regulators 26 and 27 at the inlet end of the bath are devised to maintain the temperature at the inlet end at about 1,000° C. or slightly higher over a sufficient length of the bath to ensure that the molten glass is advanced along the bath as a buoyant layer of molten glass 18 from which is developed a buoyant body of molten glass 28. The width of the tank structure is somewhat greater than the width of the buoyant body 28 at the surface level of the bath so that the buoyant layer 18 is able to flow laterally unhindered to the limit of its free flow to develop the buoyant body 28 of molten glass which is then advanced in ribbon form along the bath.

The temperature regulators 26 and 27 spaced down the bath maintain a temperature gradient such that the ribbon is cooled to a state in which it can be taken off the bath unharmed by mechanical means by the time it nears the outlet end of the bath. That is, the ribbon 21 has been progressively cooled to a temperature of about 600° C. before being taken up off the bath by the conveying rolls 23 as shown in FIGURE 1.

The roof structure 11 is at intervals provided with ducting 29 connected by branches 30 to headers 31 through which a protecting gas is fed into the headspace 15 over the bath to create a plenum of protecting gas in the substantially closed headspace. The protecting gas is a gas which will not react chemically with the metal of the bath to produce contaminants for the glass, and therefore protects the bath surface at the sides of the ribbon and under the stiffened ribbon 22 leaving the bath. Ingress of external atmosphere through the restricted inlet 17 and outlet 21 is substantially prevented.

However, minute traces of impurities, for example oxygen and/or sulphur may be present in the atmosphere over the bath or may migrate into the bath from the glass delivered to the bath. These impurities may react with the bath metal to produce reaction products which gradually rise to the bath surface and appear in the form of a fine film of dross on the bath surface.

In addition a trace of an additive metal may be maintained in the molten metal bath 9 in order to scavenge impurities from the bath by preferential reaction of the additive metal with the impurities. This scavenging action, for example when using scavenging metal such as manganese or magnesium or zinc may result in reaction products such as oxides or sulphides of these metals which tend to rise to the bath surface and then accumulate in the form of a fine dross on the surface of the bath.

The dross appears at the sides of the bath between the edges of the ribbon of glass and the side walls 6 of the tank structure and the movement of the ribbon of glass down the bath causes a flow of the film of dross down the bath surface towards the outlet end of the bath.

The present invention is for removing dross from the surface region of the molten metal and is preferably applied at the outlet end of the bath in the region where the ribbon of glass is taken up off the bath surface.

A preferred embodiment of the invention is described below in relation to the removal of dross from the bath in the region where the ribbon of glass is taken up off the bath surface, but it will be understood that the same method may be applied in any other region of the bath for the removal of dross from the bath.

FIGURE 2 indicates diagrammatically a part of the bath in the region where the ribbon of glass 22 is taken up off the bath. The normal flow of the film of dross down the sides of the bath is indicated by the arrow 32. The side walls 6 of the tank structure are formed with recesses 6a each defining a zone of the bath in the form of a pocket of molten metal of the bath which recesses 6a extend right down to the end wall 8. One of the pockets of molten metal is indicated by the reference 33.

One recess 6a containing a pocket of molten metal 33 is also illustrated in FIGURES 3, 6 and 7 which show stages in the cyclic operation of the apparatus. The tank floor 5 is extended sideways to form the floor 34 of the recess, and the tank floor slopes downwardly, as indicated at 35, in the channel by which the main body of molten metal of the bath communicates with the recess, so that the molten metal 33 in the recess has greater depth than the main body of molten metal 9 of the bath. An integral end wall 36 forms the outer wall of the recess and the outer end of the recess is formed with alcoves, respectively 37 and 38, at either side.

The side walls of the recess are stepped outwardly as indicated at 39 and 40 to form the alcoves 37 and 38. A roof 41 is supported on the top of the outer wall 36 and side walls 39 and 40 and extends up to the side wall 6 of the tank structure. The outer wall 36 of the recess is formed with an outlet 42 through which dross can be extracted from the recess, and the top surface of the wall 36 is sloped upwardly from the surface level 10 of the molten metal, as indicated at 43, to facilitate the extraction of dross.

In each of the alcoves 37 and 38 there is positioned a plunger, respectively 44 and 45, of rectangular form. The plungers 44 and 45 are made of carbon for example, and each plunger is of a height such that when it is pressed downwardly into the alcove the top surface of the plunger is above the surface level of the molten metal. In FIGURE 6 the top surface 46 of the plunger 44 is shown higher than the surface level 10 of the molten metal in the recess. The plunger 44 is supported from a rod 47 which passes through a hole 48 in the roof 41, the rod being pivotally connected to a yoke 49 on the end of a piston rod 50 which carries a piston 51, FIGURE 4. The piston 51 is slidable in a double-acting cylinder 52 carried on a bracket 53 which is fixed to the roof 41. The plunger 45 is similarly mounted on a rod 54 connected to a yoke on a piston rod 55 which carries a piston 56 slidable in a double-acting cylinder 57. The arrangement of pistons and cylinders is shown diagrammatically in FIGURE 4.

As stated above, the pocket 33 of molten metal in the recess communicates with the main body of molten metal through a channel with a floor sloping downwardly into the recess. A gate is mounted in the channel and is movable into the surface of the molten metal so that it can hold back dross in the zone as molten metal is displaced from the zone.

The gate consists of a bar 58 of carbon, silicon carbide or spheroidal graphite cast iron which is seated in slots 59 and 60 in the side walls 61 and 62 of the channel. The bar is mounted on supports 63 at the bottom of a rod 64 which passes upwardly through a hole 65 in the roof structure. The height of the bar 58 is less than the depth of the channel.

The rod 64 is pivotally connected to a yoke 66 which is fixed to the bottom of a piston rod 67 connected to a piston 68, FIGURE 4, which is slidably mounted in a double-acting cylinder 69. A bracket 70 supports the cylinder 69 above the roof 41.

As shown diagrammatically in FIGURE 4 the ends of the cylinder 52 are connected by air lines 70 and 71 through flow regulators 72 and 73, respectively, to air supply lines 74 and 75 which are connected to outlets 76 and 77 from a four-way spool valve 78 of well known kind.

Two solenoid-operated pilot valves, which are operable to determine the position of the spool in the valve 78, are indicated at 79 and 80, and the valves 79 and 80 are connected to a main air supply line 81 which is connected to a main air supply 82 through a control unit 83. The main air supply line 81 is also connected to the inlet 84 of the spool valve 78 and to the inlets to the two pilot valves 79 and 80. The other two outlets 85 and 86 from the spool valve 78 are connected to exhaust.

The two ends of the cylinder 57 are connected by lines 87 and 88 through flow regulators 89 and 90 to the lines 74 and 75 from the spool valve 78, so that operation of the valve 78 moves the two pistons 51 and 56 and hence the two plungers 44 and 45 in unison.

A similar arrangement is provided for operating the piston 68 and hence the bar 58. The two ends of the cylinder 69 are connected through flow regulators 91 and 92 by lines 93 and 94 to two outlets 85 and 96 from a second spool valve 97, of well-known kind. The main air inlet 98 to the spool valve 97 is connected to the main air supply line 81, which line 81 is also connected to two solenoid-operated pilot valves 99 and 100 which control the movement of the spool in the valve 97. The other two outlets 101 and 102 from the valve 97 are connected to exhaust.

The electrical circuit for operating the pilot valves of the spool valves 78 and 97 is shown in FIGURE 5. An alternating current supply is connected to input terminals 103 and 104 and the solenoids of the pilot valves are all connected, through switches to be described below, in parallel between lines 105 and 106 respectively connected to the terminals 103 and 104. Pilot valve 79 is controlled by a solenoid 107 connected in series with a manual switch 108 and a control switch 109 which is built into the top of the cylinder 69. In the starting position, illustrated in FIGURE 3, of the operating cycle of the apparatus, the bar 59 is raised so that the piston 68 is at the top of the cylinder 69 and the switch 109 is closed.

To start the apparatus the manual switch 108 is closed, and solenoid 107 is energised causing the pilot valve 79 to move the spool of the valve 78 so as to supply air under pressure from the main air supply line 81 to the line 74. Air under pressure is thus supplied to the tops of the cylinders 52 and 57 and the pistons 51 and 56 are depressed so that the plungers 44 and 45 are depressed to their lower positions in which they contact the floor 34 of the alcoves 37 and 38. Molten metal flows through the channel in the direction of the arrow 110 in FIGURE 6 underneath the bar 58, which in its raised position dips into the surface of the molten metal in the channel and holds back any dross on the surface of the molten metal in the recess, as indicated at 111.

There are switches 112 and 113 respectively built into the bottoms of the cylinders 52 and 57 and when the plungers 44 and 45 reach their lowermost positions as shown in FIGURE 6, these switches 112 and 113 are closed. The solenoid 114 of pilot valve 100 is connected in series with the switches 112 and 113 between the lines 105 and 106, and when the switches 112 and 113 are both closed the pilot valve 100 operates the spool valve to cause it to supply air under pressure on line 93 to the top of the cylinder 69. The piston 68 is depressed and the bar 58 lowered to the position shown in FIGURE 7 in which the bar contacts the floor of the channel thereby reducing the effective depth of the channel and leaving a shallow area of molten metal over the top of the bar.

A switch 115 is built into the bottom of the cylinder 69 and is closed when the bar 58 contacts the floor of the channel. The solenoid 116 of the pilot valve 80 is connected in series with the switch 115 between the lines 105 and 106, and is energised by closure of the switch 115 to cause the pilot valve 80 to move the spool of the valve 78 so that air under pressure is supplied on line 75 to the bottoms of the cylinders 52 and 57.

This causes the pistons 51 and 56 to rise so that the plungers 44 and 45 are raised and a flow of molten metal 117, FIGURE 7, is caused into the recess from the main part of the bath of molten metal over the top of the bar 58 which acts as a weir and accentuates the surface flow of molten metal into the recess as the plungers 44 and 45 are raised to their upper position as shown in FIGURE 7.

This accentuated surface flow of molten metal into the recess causes dross moving down the surface of the bath to be drawn into the recess as indicated by the arrow 118 in FIGURE 2.

There are two switches 119 and 120, FIGURE 5, respectively, built into the tops of the cylinders 52 and 53. These switches are connected in series with solenoid 121 of the pilot valve 99, between the lines 103 and 104. When both the switches 119 and 120 are closed, the pilot valve 99 causes the spool valve 97 to switch air under pressure from line 81 to line 94 which latter supplies air under pressure to the bottom of the cylinder 69. This causes the piston 68 to rise so that the bar 58 rises to its starting position as shown in FIGURE 3.

This completes the cycle of the operation of the apparatus which is then repeated as long as the manual switch 108 remains closed, because the rising of the piston 68 to the top of the cylinder 69 closes the switch 109 which energises the solenoid 107 of the pilot valve 6. This causes the pistons 51 and 52 to be depressed and the plungers 44 and 45 are lowered. Molten metal is displaced from the pocket while any dross on the surface of the pocket is trapped in the pocket as shown at 111 in FIGURE 3, and the operation proceeds in the manner described above. This trapped dross may be drawn continually by means of a brush or scraper operated through the outlet 42 over the surface 43 of the end wall 36 into a receptacle 122 for the dross shown in FIGURE 2.

The apparatus may be modified as illustrated in FIGURE 7, by providing a sill in the recess behind which dross is collected in the manner described in U.S. Patent application No. 368,260.

As shown in FIGURE 8 bridges 123 span the open side of each of the alcoves 37 and 38 at the surface level 10 of the molten metal leaving room for movement of the plungers. A bar 124, for example, of silicon carbide or carbon is mounted between the bridges 123 so that the top surface 125 of the bar is exposed above the level 10 of the molten metal and forms a sill behind which dross can be collected. The bar 124 is parallel to the end wall 36 and delimits a surface region 126 of the pocket of molten metal between the bar 124 and the end wall 36.

As described in the above mentioned co-pending patent application a brush or scraper may be drawn over the surface of the molten metal towards the sill from the region of the gate 58 so that it brushes in dross on the surface of the pocket of molten metal up to and over the sill 125. The dross collected behind the sill is indicated at 127 and is allowed to remain behind the sill for a time sufficient to permit any molten metal in the dross 127 to drain back into the region 126 of the pocket of molten metal. The dross 127 is then extracted through the outlet 42 either by means of the brush or by means of a raking tool, not shown.

Alternatively dross may be removed from the molten metal in the zone by electrolytic means as described in British patent application No. 32758/63.

It will be understood that there is a recess of the kind described opening into each side of the bath of molten metal in the region where the ribbon of glass is taken up from the bath surface. If so desired such recesses may also be provided higher up the bath if an undesirable dross exists higher up the surface.

In the embodiment described above two plungers in alcoves in each recess are employed but this arrangement may be modified. For example, a single plunger may be used extending across the whole width of the recess. Alternatively a "diving bell" arrangement may be used in which a stationary bell is immersed in the recess and flow of molten metal into and out of the recess is caused by supplying atmosphere under pressure to the bell and subsequently extracting this atmosphere from the bell.

The invention thus provides means for continually extracting dross from the bath of molten metal so that the presence of dross is minimised and any dross produced by the continual scavenging of the bath metal by means of additives is continuously removed from the bath as it is formed.

The invention also comprehends flat glass produced by the method of the invention and sheets of glass cut there from.

We claim:

1. Apparatus for use in the manufacture of flat glass, comprising an elongated tank structure containing a bath of molten metal and including structural means defining a laterally recessed zone of the molten metal of the bath, means for advancing glass along the bath towards an outlet from the bath, means associated with said zone for enlarging and reducing the effective volume of the zone, flow constraining means for constraining a surface flow of molten metal into said zone so that dross on the surface of the molten metal is carried into the zone, means in the zone for trapping dross on the molten metal surface in the zone, and means for constraining as an undercurrent the return flow of molten metal from the zone.

2. Apparatus for use in the manufacture of flat glass, comprising an elongated tank structure containing a bath of molten metal and including structural means defining a laterally recessed zone of molten metal of the bath, means for advancing glass along the bath towards an outlet from the bath, a plunger associated with the zone, cyclically operable means connected to the plunger to lower it into the zone and retract it therefrom so as to displace molten metal from said zone and then to permit flow of molten metal back into the zone so that dross on the surface of the molten metal is carried into the zone, and a gate movable through the surface of the molten metal and operable to hold back in the zone dross on the surface of the zone of molten metal, as molten metal is displaced from the zone.

3. Apparatus according to claim 2, wherein the main tank structure communicates with the recess through a channel, and the outer end of the recess is formed to co-operate with at least one plunger which is movable into and out of the recess to displace molten metal from the pocket through the channel and then to induce flow of molten metal into the pocket.

4. Apparatus according to claim 3, wherein the outer end of the recess is formed with an alcove at either side, and there are two plungers respectively movable into and out of said alcoves.

5. Apparatus for use in the manufacture of flat glass, comprising an elongated tank structure containing a bath of molten metal and including structural means defining a zone of molten metal of the bath, means for advancing glass along the bath towards an outlet from the bath, means operable to displace molten metal from said zone and then to permit flow of molten metal back into the zone so that dross on the surface of the molten metal is carried into the zone, and a gate movable through the surface of the molten metal and operable to hold back in the zone dross on the surface of the zone of molten metal, as molten metal is displaced from the zone, said zone being in the form of a recess which contains a pocket of molten metal and with which the main tank structure communicates through a channel, the outer end of the recess being formed to co-operate with at least one plunger which is movable into and out of the recess to displace molten metal from the pocket through the channel and then to induce flow of molten metal into the pocket, said gate consisting of a bar seated in slots in the side walls of the channel, the height of the bar being less than the depth of the channel, and said apparatus further including means for raising and lowering the bar in synchronism with the movement of said plunger or plungers, so that when the bar is lowered to contact the floor of the channel surface flow of molten metal into the pocket is accentuated, and when the bar is raised into the surface of the molten metal in the channel molten metal from the pocket can be displaced under the bar while the bar traps any dross on the surface of the molten metal in the pocket.

6. Apparatus according to any claim 2, including a sill fixed in the recess across the pocket to delimit a region of the pocket, means for directing dross from the surface of the molten metal and over the sill so that dross is collected behind the sill, and wherein the outer wall of the recess is formed with an outlet through which collected dross can be removed.

7. In the manufacture of flat glass in ribbon form during which glass is advanced along a bath of molten metal including a defined zone of bath metal spaced from but alongside the path of travel of the ribbon along the bath, a method of removing dross from the surface of the bath of the molten metal by first causing a surface flow of molten metal into the zone so that dross on the exposed surface of the molten metal bath alongside the path of travel of the ribbon is carried into the zone, and then displacing molten metal from the zone by causing an undercurrent of molten metal from the zone while trapping on the surface of the molten metal in the zone any dross carried into the zone.

8. A method according to claim 7, including cyclically increasing the effective volume of the zone of molten metal while reducing the effective depth of the flow of molten metal into the zone so as to cause said surface flow of molten metal into the zone, shutting-off said surface flow of molten metal to hold back in the zone dross on the surface of the molten metal in the zone, and then reducing the effective volume of the zone to create a return flow of molten metal from the zone while constraining that return flow as an undercurrent beneath the shut-off surface of the molten metal.

9. Apparatus for use in the manufacture of flat glass, comprising an elongated tank structure containing a bath of molten metal and including structural means defining a laterally recessed zone of the molten metal, means for advancing glass along the bath towards an outlet from the bath, a gate extending across an area between said zone and a portion of the bath from which dross at the surface of the molten metal may be carried into said zone and movable between a position wherein it closes off only a lower portion of the bath at said area and a position wherein it closes only an upper portion of the bath at said area, displacement plunger means movable into and out of the bath in said zone, means to reciprocate said plunger means, and means to move said gate into its second-mentioned position prior to the movement of the plunger means into the bath and to move said gate into its first-mentioned position prior to the movement of the plunger means out of the bath, whereby dross is trapped in said zone for removal therefrom.

References Cited
UNITED STATES PATENTS 3,248,197   4/1966   Michalik et al. _____ 65—65

FOREIGN PATENTS 1,323,711   3/1963   France.

DONALL H. SYLVESTER, *Primary Examiner.*

A. D. KELLOGG, *Assistant Examiner.*